A. B. MUELLER.
PICTURE PROJECTION APPARATUS.
APPLICATION FILED NOV. 7, 1917.

1,389,775.

Patented Sept. 6, 1921.
3 SHEETS—SHEET 1.

Inventor:
Albert B. Mueller

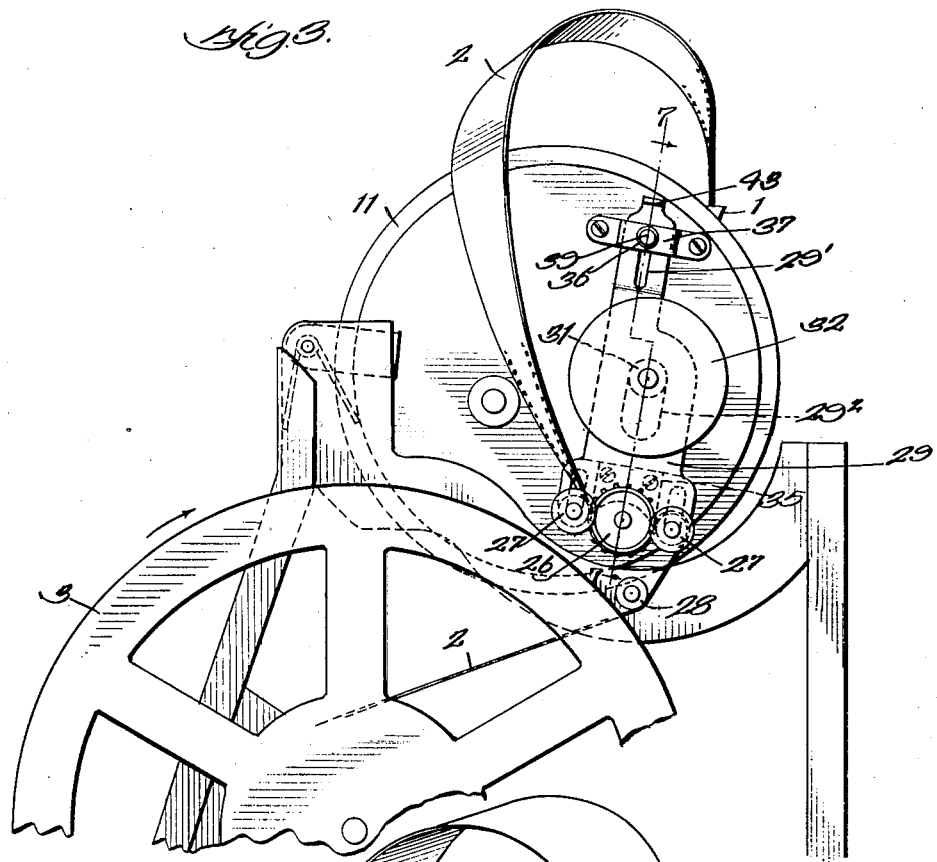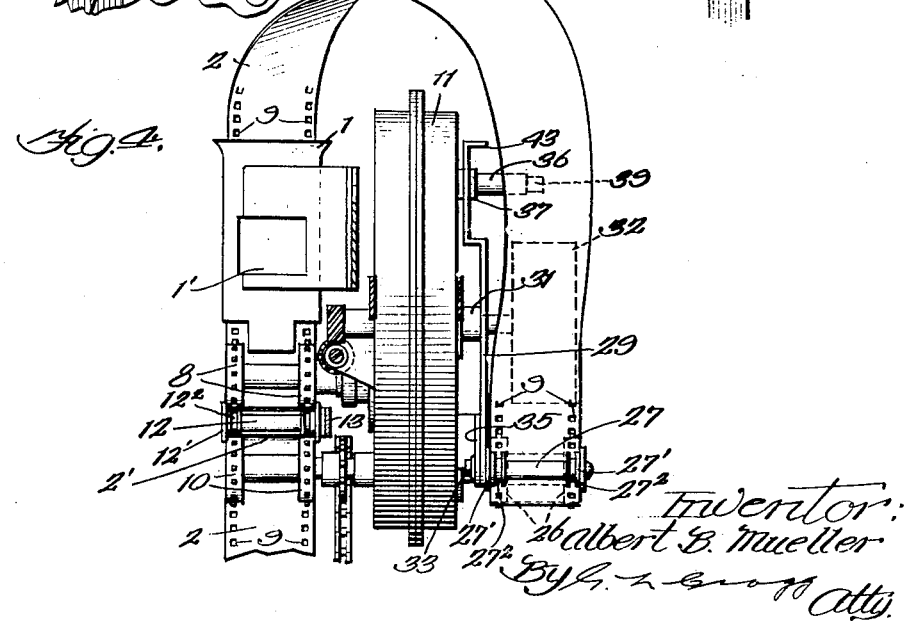

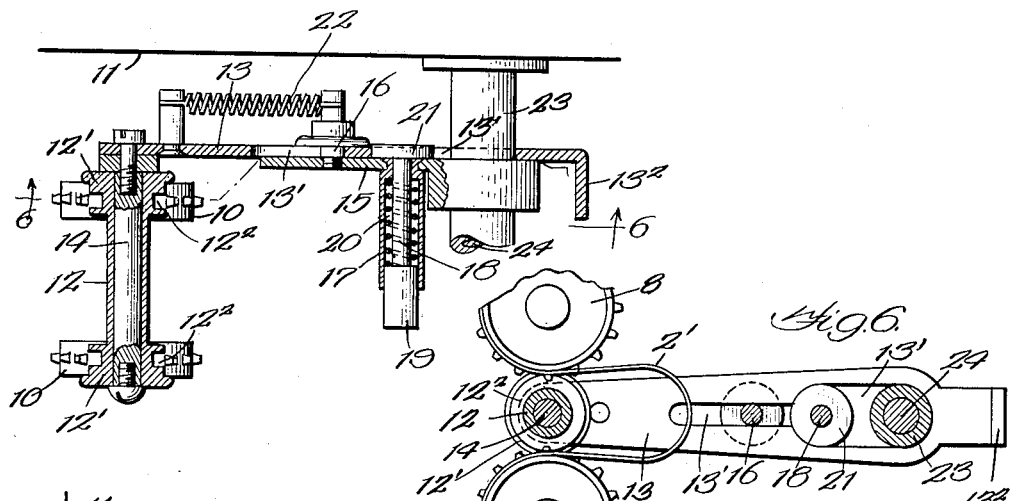

UNITED STATES PATENT OFFICE.

ALBERT B. MUELLER, OF CHICAGO, ILLINOIS.

PICTURE-PROJECTION APPARATUS.

1,389,775.　　　　　Specification of Letters Patent.　　Patented Sept. 6, 1921.

Application filed November 7, 1917. Serial No. 200,690.

*To all whom it may concern:*

Be it known that I, ALBERT B. MUELLER, citizen of the United States, residing at Chicago, in the county of Cook and State of Illinois, have invented a certain new and useful Improvement in Picture-Projection Apparatus, of which the following is a full, clear, concise, and exact description.

My invention relates to motion picture projection apparatus employed either in projecting pictures upon screens or in projecting pictures from negatives in the operation of printing upon positives. Apparatus in conjunction with which my invention may be employed to advantage, but to which form of apparatus my invention is not to be limited, includes a guide having openings therein through which picture projecting light is passed and through which guide picture bearing film is passed successively to present pictures to the openings in the guide. The apparatus also includes an intermittently operated pinion structure for effecting step by step movement of the film through the guide, a second pinion structure having continuous rotation for passing the film on from the intermittently operated pinion, and a reel upon which the film is wound as it passes from the second pinion structure. The film is looped between the aforesaid pinion structures in order that the continuously operating pinion structure may feed the film toward the reel at times when the intermittently operated pinion structure is at rest and without regard to the rate at which the intermittently operated pinion structure moves the film toward the continuously operated pinion structure.

The film is fed between the other reel and the guide by means of another constantly operating pinion structure. My present invention concerns this latter structure and resides in providing an idler roller near this pinion structure to maintain the film in mesh therewith and also, desirably, another idler roller between which and the other roller the pinion structure is disposed. Both of these rollers are mounted to move toward and from the pinion structure associated therewith in order that the film may be adjusted upon such pinion structure. There is also desirably provided another idler roller near the pinion structure which is interposed between the pinion structure and the portion of the film passing between the adjacent reel and one of the other rollers to prevent this pinion structure from injuring the film as to passes thereto.

Figure 1:
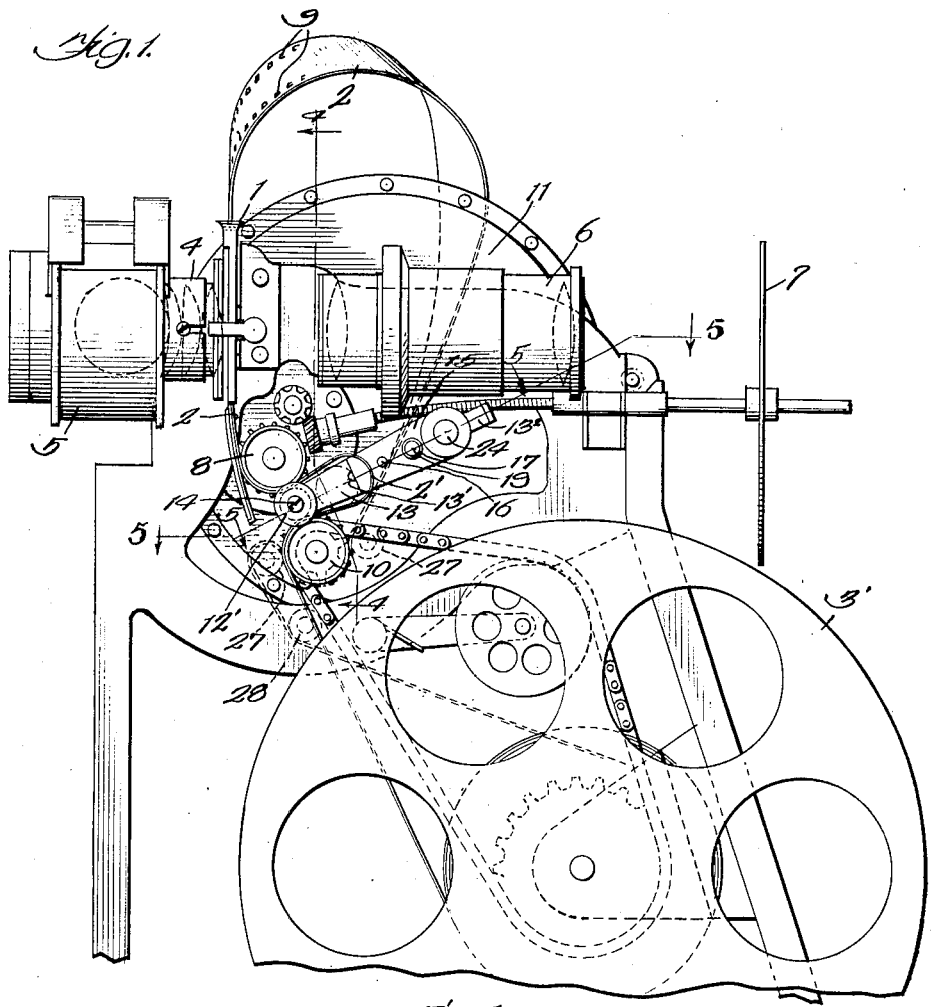
Figure 2:
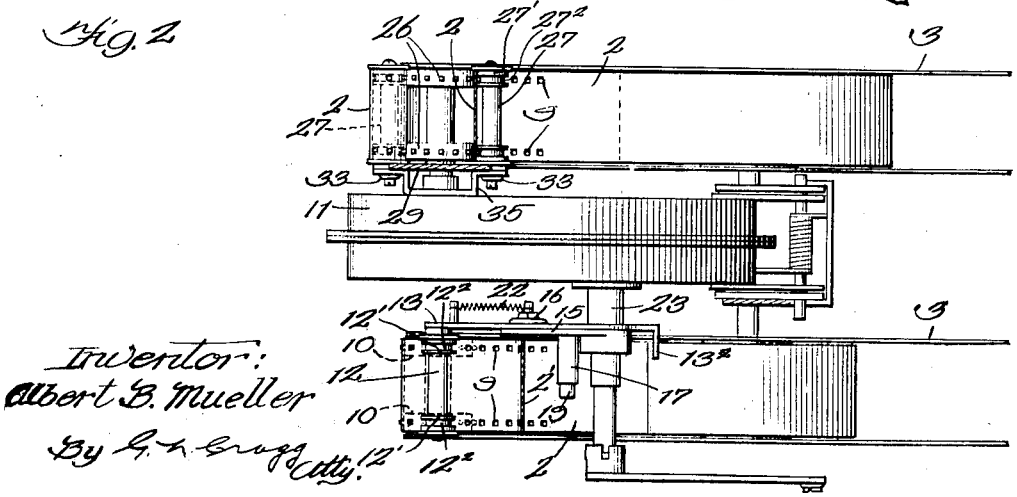

I will explain my invention more fully by reference to the accompanying drawings in which Figure 1 is a front side view of so much of a motion picture apparatus as is necessary to understand the relation of my invention thereto; Fig. 2 is a sectional plan view of the structure shown in Fig. 1 with some of the parts omitted; Fig. 3 is a rear side view of a part of the apparatus; Fig. 4 is a view on line 4—4 of Fig. 1; Fig. 5 is a view on line 5—5 of Fig. 1; Fig. 6 is a view on line 6—6 of Fig. 5; Fig. 7 is a view on line 7—7 of Fig. 3; Fig. 8 is a view on line 8—8 of Fig. 7; and Fig. 9 is a view on line 9—9 of Fig. 8.

Like parts are indicated by similar characters of reference throughout the different figures.

The motion picture apparatus illustrated is one which is adapted to the projection of pictures upon a screen and includes a guide 1 through which picture bearing film 2 is fed downwardly from the supply reel 3. Upon the rear side of the guide 1 is the condensing lens structure 4. At the rear of this lens structure there is a lamp 5 contained in a suitable housing. In front of the guide 1 there is the projecting lens structure 6 and in front of this projecting lens structure is the shutter 7 that permits and prevents the passage of light to the screen, as is well understood. The film is downwardly fed through the guide by means of an intermittently operated pinion structure 8 which, in this instance, includes two pinons, the teeth upon each being in mesh with the apertures 9 along the two longitudinal edges of the film. I do not wish to be limited however, to the inclusion of two pinions in such pinion structure. This pinion structure is turned one step to remove such picture from the presence of the condensing lens structure 4 and to substitute a succeeding picture for the removed picture, it requiring, in the construction shown, one revolution of the pinion structure 8 for the successive presentation of four pictures, it taking a quarter of a revolution to replace each picture by a succeeding picture. The means by which the pinon structure 8 is thus intermittently operated is well known by those skilled in the art and does not need illustration or description.

The film is passed downwardly on from the pinion structure 8 by the pinion structure 10 that likewise has two pinions but to the employment of which two pinions the invention is not to be limited. The pinion structure 10 is uninterruptedly operated at a constant rate of speed by suitable gearing which is familiar to those skilled in the art. The gearing for operating the pinion structures 8 and 10 is included in the gear casing 11 commonly known as a head. The film is passed from the pinions 10 to that which is normally the winding reel $3^1$. The film is formed into a loop $2^1$ between the pinion structures 8 and 10 in order that the film may leave the pinion structure 8 step by step and may be uninterruptedly passed downwardly on at the pinion structure 10 at a uniform rate of speed.

By means of the invention disclosed in my co-pending application Serial No. 200,684, filed November 7, 1917, but more generically covered herein the equipment employed for maintaining the film in mesh with the pinion structures 8 and 10 is simplified and is inclusive of a single idler roller 12 that enters the loop $2^1$ and presses the sides of the loop toward the pinion structures to maintain the film in mesh therewith. This roller is movable out of relation with the pinion structures 8 and 10 to permit of the adjustment of the film upon the pinion structures and this movement of the roller for this purpose is toward the bight in the loop $2^1$ and is in a line that is perpendicular to the plane containing the axes of the pinion structures 8 and 10. The roller 12 has a head $12^1$ at each end, there being a groove $12^2$ in each head that is in the plane of the teeth upon the pinion structures 8 and 10, the pinions of one pinion structure being in the same planes with the pinions of the other pinion structure. These grooves $12^2$ receive the teeth upon the pinions. The parts of the roller heads $12^1$ along side of these grooves $12^2$ engage the film and hold it against the sides of the pinions that are adjacent the teeth thereof whereby the roller heads maintain the film and pinions in mesh. The idler roller 12 has a mounting which is inclusive of a mounting plate 13 and a shaft 14 carried by this plate and upon which shaft the roller is free to turn idly. The mounting plate 13 has a slot $13^1$ extending lengthwise thereof and in the direction in which the mounting plate is reciprocable. A stationary bracket 15 carries a stationary screw 16 that projects through the slot $13^1$. The stationary bracket 15 carries a spring barrel 17 in which a plunger 18 is reciprocable. This plunger 18 has a front head 19 by which the plunger may be pressed inwardly against the force of a spring 20. The plunger 18 has a rear head 21 that is normally received in the larger right hand end of the slot $13^1$ and normally engages the mounting plate 13 at the left hand end of such enlarged portion of the slot $13^1$, as indicated clearly in Fig. 4. When the plunger 18 is pressed inwardly against the force of the spring 20 the plunger head 21 is moved rearwardly out of the slot $13^1$ whereupon the retractile spring 22 (which is anchored at one end to the reciprocable plate 13 and at the other end to the stationary screw 16 upon the stationary bracket 15) pulls the mounting plate 13 toward the stationary bracket 15 in which movement of the mounting plate the idler roller 12 is moved away from the pinion structures 8 and 10 farther into the loop $2^1$ in the film and toward the bight of such loop. When the roller 12 is to be restored to its normal position between the pinion structures 8 and 10 the loop $13^2$ upon the mounting plate 13 is pressed toward said pinion structure against the force of the spring 22 and when the larger and right hand part of the slot $13^1$ is moved into registry with the plunger head 21, the spring 20 will force the movement of the head 21 into such larger portion of the slot $13^1$ whereupon such head 21 maintains the roller 12 in its normal position against the force of the spring 22. The screw 16 and the bearing 23 for the shaft 24 that operates the gearing 8, 10, by means that need not be illustrated, coöperate to define the direction of reciprocable movement of the plate 13. The plunger 18, its head 21 and the spring 20 constitute a form of latch whereby the mounting plate 13 is held in its normal position and which latch is tripped when the plunger is pressed inwardly to permit the mounting plate to be withdrawn toward the bracket 15 to bring the roller 12 farther into the loop $2^1$.

I will now refer more particularly to the part of the structure that embraces all features of my invention herein broadly and specifically claimed. The supply reel 3 is normally upon the rear side of the apparatus and is free to be rotated by the film 2 as such film is drawn from said reel. The film is drawn from the supply reel by the pinion or sprocket gear structure that preferably includes two pinions 26 that are in fixed relation and co-axial. These pinions, during the normal operation of the apparatus, are uninterruptedly rotated at a uniform rate of speed. They are also driven by the gearing located within the gear casing 11. Two idler rollers 27 are disposed near the pinion structure 26, this pinion structure being disposed between said rollers whereby the rollers are enabled to engage the film and preserve it in mesh with the teeth of said pinion structure. Each roller 27 preferably has a head $27^1$ at each end, there being a groove $27^2$ in each head that is in the plane of the teeth upon the pinions 26. These grooves $27^2$ receive the teeth upon the pinions. The parts of the roller heads $27^1$ along side of these grooves $27^2$ engage the film and hold it against the sides of the pinions that are adjacent the teeth thereof whereby the roller heads maintain the film and pinions in mesh. The film is looped where the pinions 26 are located and the rollers 27 maintain the bight of this loop in mesh with the pinions. The pinions 26 feed the film upwardly toward the guide 1, sufficient slack intervening between the pinions 26 and said guide to enable the film to be fed downwardly through said guide by the intermittently operating pinion structure 8 without disturbing the engagement of the pinions 26 with the film.

An idler roller 28, or other film engaging element near the pinion structure 26 is interposed between said pinion structure and the portion of the film passing between the reel 3 and the roller 27 that directs the film to the pinions 26. The idler roller 28 prevents the film, before it reaches said latter roller 27, from coming into damaging contact with the teeth of the pinions 26. The damaging contact of the film with the teeth of the pinions 26 would be apt to occur when the reel 3 is full of film were it not for the idler roller 28. The rollers 27 are mounted to be movable from their normal positions whereby they may be separated from the pinions 26 to permit of the adjustment of the engagement of the film with the pinions 26. These rollers are desirably moved from their normal positions upwardly and away from the bight of the film that receives the pinions 26. The rollers 27 have a common mounting which is inclusive of a mounting plate 29 and a shaft 30 carried by this plate and upon which shaft the roller is free to turn idly. The mounting plate 29 has a slot $29^1$ extending lengthwise thereof and in the direction in which the mounting plate is reciprocable. The mounting plate also has another slot $29^2$ that also extends in the direction in which the mounting plate is reciprocable, this slot being in sliding fit with the bearing 31 of the counterweight 32 that is connected with the intermittent gearing to steady the motion of such intermittent gearing as is understood by those skilled in the art. The shanks of the screws 33 by which the roller shafts 30 are mounted upon the plate 29 are enlarged at their outer ends and there pass through and are in sliding fit with slots 34 in the stationary bracket 35, these slots 34 being in the direction of reciprocable movement of the rollers 27. The slots $29^2$ and 34 guide the mounting plate in its movements, the direction of movements of this mounting plate being desirably perpendicular to the plane that includes the axes of the rollers 27. When these rollers are in normal position the screws 33 are at the lower ends of the slots 34 and when the rollers have been moved upwardly away from the bight in the film that receives the pinions 26 the screws 33 are at the upper ends of the slots 34. The plate or mounting 29 and the idler roller supported thereby are movable in a line substantially at right angles to the line normally including the centers of the pinion and roller structures, the guide structure illustrated defining this direction of movement.

A spring barrel 36 is carried by a stationary bracket 37. A plunger 38 is reciprocable in the spring barrel. This plunger 38 has a front head 39 by which the plunger may be pressed inwardly against the force of the spring 40. The plunger 38 has a rear head 41 that is normally received in the large upper end of the slot $29^1$ normally to engage the mounting plate 29, as indicated clearly in Fig. 8. When the plunger 38 is pressed inwardly against the force of the spring 40 the plunger head 41 is moved rearwardly out of the slot $29^1$ whereupon the retractile spring 42 (which is anchored at one end to the reciprocable plate 29 and at the other end to the bearing 31) pulls the mounting plate 29 upwardly by which movement of the mounting plate 29 the idler rollers 27 are moved upwardly and away from the bight in the film that receives the pinions 26 whereafter the engagement of the film with these pinions may readily be adjusted. When these rollers 27 are to be restored to their normal position the lug 43 upon the mounting plate 29 is pressed toward the pinions 26 against the force of the spring 42 and when the larger and upper end of the slot $29^1$ is moved into registry with the plunger head 41 the spring 40 will force the movement of the head 41 into such larger portion of the slot $29^1$ whereby such head 41 maintains the rollers 27 in their normal positions against the force of the spring 42. The idler rollers 12 and 27 are so related with the pinions adjacent thereto that the film may readily be caused to travel in a reverse or upward direction through the guide 1 as well as in the normal downward direction without readjustment of these rollers and pinions, in which event the reel 3 would become the winding reel and the reel $3^1$ would become the supply reel.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

1. Picture projection apparatus including a reel carrying a picture bearing film; a pinion structure in mesh with the film; idler rollers between which the pinion structure is disposed and which rollers are near said pinion structure to maintain the film in mesh therewith; a mounting for said rollers which is movable from its normal position to separate the rollers from the pinion structure; a spring for moving said mounting; and a latch for holding the mounting against the action of the spring.

2. Picture projection apparatus including a reel carrying a picture bearing film; a pinion structure; an idler roller structure for maintaining the film in mesh with the pinion structure; and guiding means for directing movement of the idler roller structure in a line substantially at right angles to the line normally joining the centers of the pinion and roller structures.

In witness whereof I hereunto subscribe my name this eighth day of October, A. D. 1917.

ALBERT B. MUELLER.